Sept. 11, 1951 J. J. OKRENT 2,567,574
INTEGRATING CIRCUIT
Filed May 29, 1946
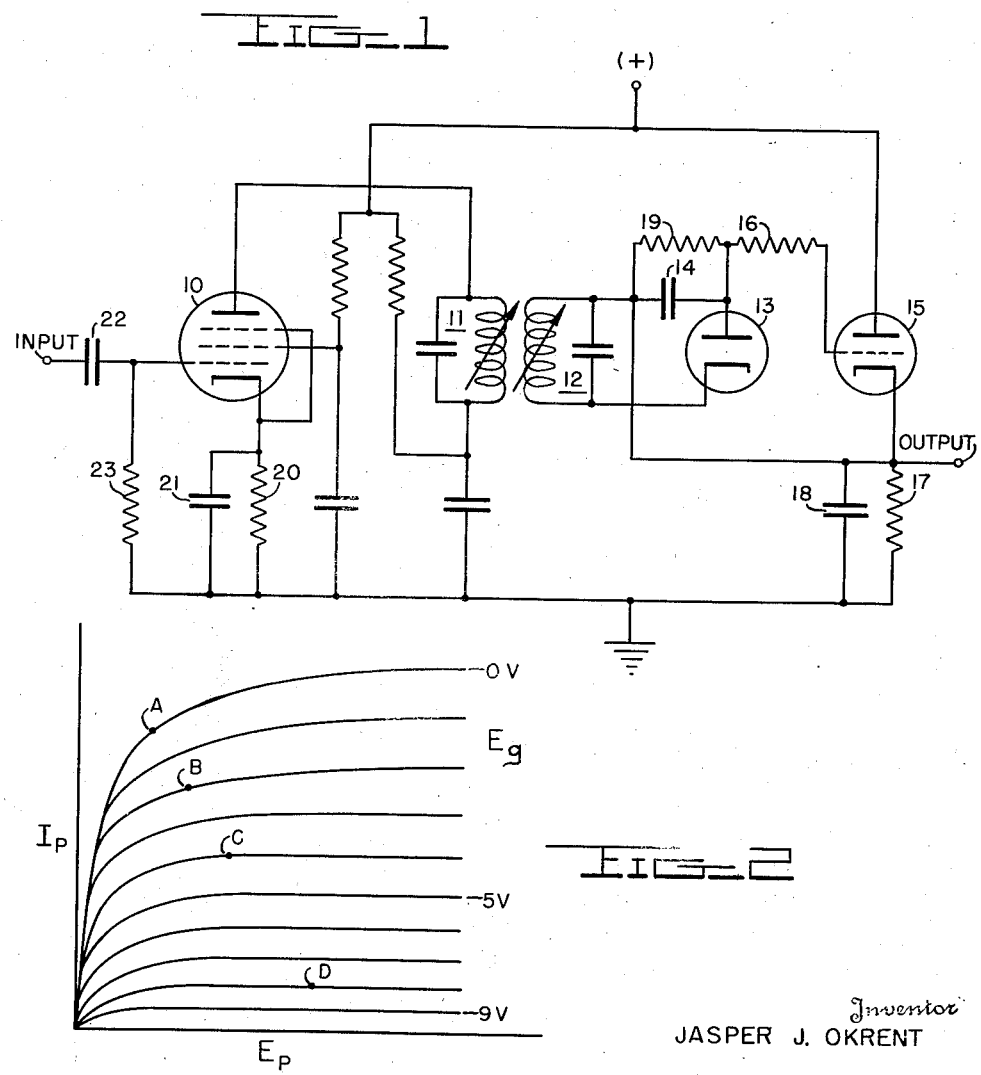
Inventor
JASPER J. OKRENT Patented Sept. 11, 1951

2,567,574

UNITED STATES PATENT OFFICE 2,567,574

INTEGRATING CIRCUIT

Jasper J. Okrent, Great Neck, N. Y., assignor, by mesne assignments, to the United States of America as represented by the Secretary of the Navy Application May 29, 1946, Serial No. 673,201

3 Claims. (Cl. 250—27)

1

This invention relates to electrical waveform integrating systems and in particular to integrating systems for producing a voltage level proportional to the average value of a series of recurrent pulse signals.

In many instances it is desirable to have an integrating circuit responsive to the average peak amplitude of a series of pulse signals occurring at a regular time interval. Where occasional pulse signals have amplitudes which are considerably greater than the average pulse amplitude, conventional integrating systems are not entirely satisfactory because of hang-over effects in time constant circuits as a result of the large amplitude pulses. These hang-over effects prevent the output signal from being truly proportional to the average peak amplitude and are particularly noticeable where a circuit tuned to the recurrence frequency of the pulse signal is employed in the integrating system. Shock excitation of the tuned circuit may be produced by the large amplitude pulses so that a series of damped waves will occur thereafter which may possess a peak amplitude larger than the average peak pulse amplitude for a considerable period of time following each of the large amplitude pulses.

It is therefore an object of the present invention to provide an integrating circuit for producing a voltage level proportional to the average peak amplitude of a series of pulses.

Another object of the present invention is to provide a tuned integrating circuit responsive to the average peak amplitude of repetitive pulse signals in which occasional pulses may be of an amplitude considerably larger than the average pulse amplitude and in which shock excitation of the tuned circuits by the large amplitude pulses is of minimum consequence.

Other and further objects and features of the present invention will become apparent upon a careful consideration of the accompanying description and drawing, in which Figure 1 is a schematic diagram showing a typical embodiment of the invention, and Figure 2 shows a series of characteristic curves for a typical pentode type electron tube.

In accordance with the general principles of the present invention, a tuned integrating circuit is provided which is capable of producing a unilateral voltage level proportional to the average peak amplitude of a recurrent pulse signal in which the amplitude of some of the pulse signals may be many times the average pulse amplitude. A tuned circuit is incorporated within the integrating circuit to minimize the circuit response to signals of other than the frequency of the desired pulses. Rapid damping of the tuned circuit is employed to minimize large amplitude oscillations thereof so that they cannot persist for any great length of time following the occurrence of a large amplitude input pulse signal. The tuned circuit is located in the path of plate current flow of an amplifier tube which is operated in a selected region of its characteristics so that amplification of the input pulse signals will occur but between input pulses a plate circuit condition will exist which causes rapid damping of any oscillations produced in the tuned circuit by preceding pulse signals.

With reference to Figure 1, a peak pulse integrating system is shown in which a pentode type electron tube 10 is employed to amplify a series of negative input pulses recurring at uniform time intervals. Disposed in the path of plate current flow for tube 10 is an anti-resonant tuned circuit 11 which is tuned to the recurrence frequency of the input pulse signals. Coupled to the tuned circuit 11 is a second anti-resonant tuned circuit 12 across which is placed a diode rectifier 13. Conduction by diode 13 on the peaks of the pulse signals across circuit 12 results in the development of a D.-C. voltage across capacitance 14. The voltage level developed across capacitance 14 is applied between grid and cathode of a cathode loaded amplifier tube 15 through a resistive path 16. The cathode load for the amplifier 15 comprises a resistive path 17 and a smoothing capacitance 18. Across this load is obtained a D.-C. level which is proportional to the average peak amplitude of the input pulses. This level is smooth, being filtered by the two resistance-capacitance filter networks consisting of capacitance 14—resistance 19 and capacitance 18—resistance 17.

The plate voltage for the operation of tube 10 is quite critical. With reference to Figure 2 a series of curves representing the anode circuit characteristics of a typical pentode type electron tube is shown in which the anode current $I_p$ for various values of anode voltage $E_p$ and control grid voltage $E_g$ is plotted. A zero bias condition of tube 10 is selected which would place operation at point A in the region of the "knee" of the curve and with low dynamic anode impedance. A small voltage which is developed across the cathode biasing circuit 20, 21 places quiescent operation of the tube 10 at point B. Upon the application of negative input signals of low amplitude the grid of tube 10 may be driven to a point corresponding to C in the region of high dynamic anode impedance. Larger negative signals may drive tube 10 to an operational point corresponding to D which is still in the region of high dynamic anode impedance and high gain. It will be seen that at point A the dynamic anode impedance of tube 10, which corresponds to the slope of the curve at that point, is quite low, and is equivalent to a small resistance in the shunt with the tuned circuit 11. At each of points B, C, and D the anode impedance of tube 10 is large and hence will produce negligible damping of the circuit 11.

The input coupling circuit to tube 10, comprising capacitance 22 and resistance 23, is preferably of a short time constant variety so that an appreciable differentiation of the input negative pulses occurs. Tube 10 may thus be driven in the region of high dynamic anode impedance by the leading portion of the negative input pulses, however, the trailing portion of the differentiated pulses may drive tube 10 to a condition of zero bias near point A. Thus even though the tuned circuits 11 and 12 may be shocked into damped oscillations upon the application of large amplitude negative impulses, the low dynamic anode impedance produced in tube 10 when it is driven to point A causes rapid damping of the oscillations.

From the foregoing discussion it is apparent that considerable modification of the features of the present invention is possible and while the device herein described and the form of apparatus for the operation thereof constitutes a preferred embodiment of the invention it is to be understood that the invention is not limited to this precise device and form of apparatus and that changes may be made therein without departing from the scope of the invention as defined in the appended claims.

What is claimed is:

1. A tuned electrical apparatus for integrating periodically recurring voltage pulses having a self-damping frequency responsive circuit and comprising, a tuned circuit tuned to the repetition frequency of the voltage pulses, a pentode electron tube connected in alternating current shunt relation with said tuned circuit, said electron tube being biased so as to have a normally low dynamic anode impedance which becomes high in response to negative voltage pulses, an input channel for said electron tube, and a long time constant rectifier circuit connected to said tuned circuit and responsive to voltage variations in said tuned circuit.

2. A tuned electrical apparatus for integrating periodically recurring voltage pulses having a self-damping frequency responsive circuit and comprising, a tuned circuit tuned to the repetition frequency of the voltage pulses, a pentode amplifier tube connected in alternating current shunt relation with said tuned circuit, said tube being biased so as to have a normally low dynamic anode impedance which becomes high in response to negative voltage pulses, a differentiating circuit connected to a control grid of said tube for producing sharp negative and positive pulses responsive respectively to the leading and trailing edges of negative input pulses, a long time constant rectifier circuit connected to said tuned circuit and responsive to voltage variations in said tuned circuit, a vacuum tube having at least a cathode, anode, and control grid, a long time constant load impedance connected to said cathode, said grid being connected to the long time constant rectifier circuit to vary conduction in said last named tube in response to the voltage in said rectifier circuit.

3. In a tuned electrical apparatus for integrating periodically recurring voltage pulses, a self-damping frequency responsive circuit comprising, a tuned circuit tuned to the repetition frequency of the voltage pulses, a pentode electron tube connected in alternating current shunt relation with said tuned circuit and biased to have a normally low dynamic anode impedance which becomes high in response to negative input signals, an input channel for said electron tube including a differentiating circuit for producing respectively sharp negative and positive pulses in response to the leading and trailing edges of the negative input pulse.

JASPER J. OKRENT.

REFERENCES CITED

The following references are of record in the file of this patent:

UNITED STATES PATENTS

| Number | Name | Date |
|---|---|---|
| 2,053,076 | Grimes | Sept. 1, 1936 |
| 2,227,906 | Kellog | Jan. 7, 1941 |
| 2,357,932 | Crosby | Sept. 12, 1944 |
| 2,440,547 | Jenson | Apr. 27, 1948 |
| 2,442,769 | Kenyon | June 8, 1948 |
| 2,449,848 | Hefele | Sept. 21, 1948 |